Nov. 30, 1965 W. H. MacDONALD 3,220,521
ACCELERATOR AND BRAKE CONTROL FOR AUTOMOTIVE VEHICLE
Filed Feb. 11, 1964 2 Sheets-Sheet 1
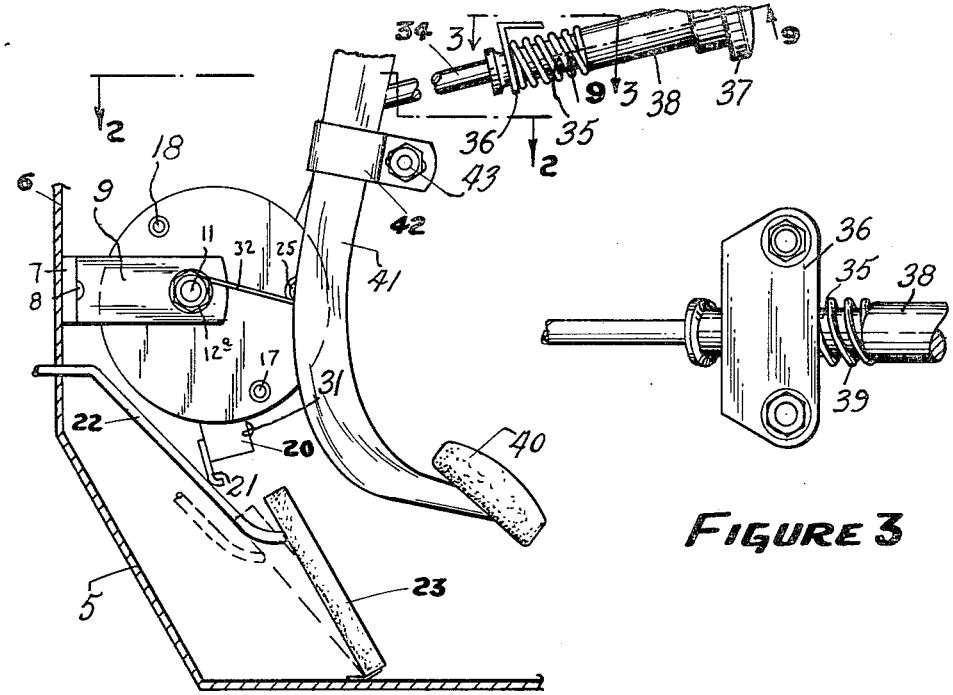
FIGURE 1
FIGURE 3
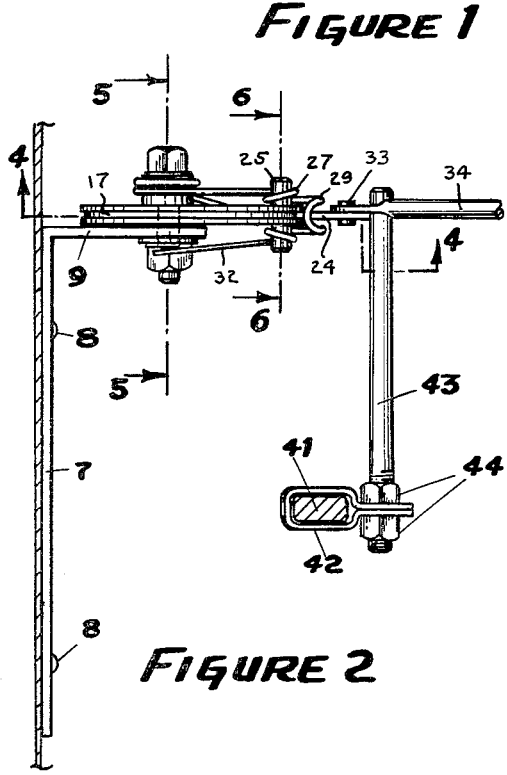
FIGURE 2
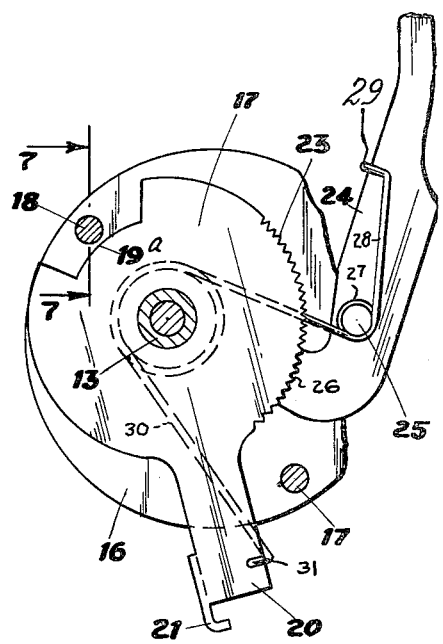
FIGURE 4
INVENTOR.
WILLIAM H. MAC DONALD
BY
ATTORNEY

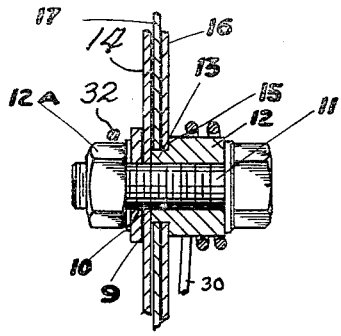
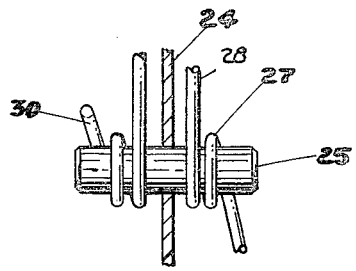
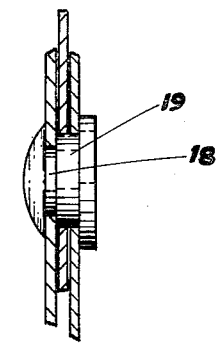
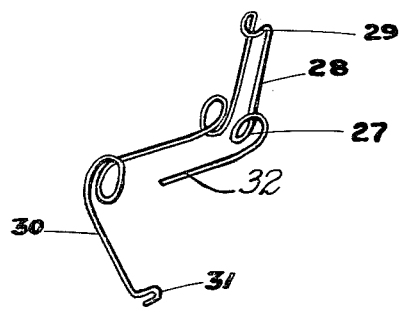
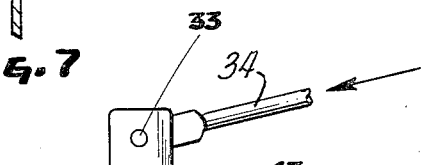
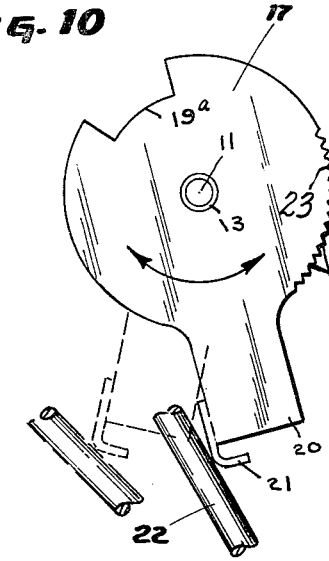
Nov. 30, 1965     W. H. MacDONALD     3,220,521
ACCELERATOR AND BRAKE CONTROL FOR AUTOMOTIVE VEHICLE
Filed Feb. 11, 1964     2 Sheets-Sheet 2
INVENTOR.
WILLIAM H. MAC DONALD
BY
*James W. Oler*
ATTORNEY

United States Patent Office 3,220,521
Patented Nov. 30, 1965

3,220,521
ACCELERATOR AND BRAKE CONTROL FOR AUTOMOTIVE VEHICLE
William H. MacDonald, Fort Lauderdale, Fla., assignor to Automotive Speed Controls, Inc., Fort Lauderdale, Fla., a corporation of Florida
Filed Feb. 11, 1964, Ser. No. 344,141
6 Claims. (Cl. 192—3)

This invention relates to speed control mechanism for motor vehicles and whereby an operator of the motor vehicle may set and hold a constant selected speed without further depressing the accelerator and that will maintain the speed constant so long as the device is set and that may be quickly released when desired.

The device includes mechanism that is associated with both the accelerator pedal and the brake pedal and that will function to lock the accelerator pedal at any point and with the locking mechanism being automatically released by slight motion of the brake pedal.

The invention comprises generally a bracket device that is fixed to the dashboard and that rotatably supports a latch device that is biased toward the rod of the accelerator and with the latching device being provided with teeth upon one edge for interlocking engagement with a locking lever and with the locking lever lying in the path of movement of a rod that is carried by the brake arm above the brake pedal and with the locking lever being normally biased to interlocking engagement with the teeth and the latch and whereby a slight movement of the brake pedal functions to release the lock lever and permit the latching device to shift to engagement with the accelerator pedal rod in its depressed position so as to maintain the vehicle at a predetermined speed, the said mechanism being relatively simple and highly effective to both set and release the accelerator pedal.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

In the drawings:

FIGURE 1 is a sectional view through the forward compartment of the vehicle and showing the invention associated with the accelerator pedal and the brake pedal, FIGURE 2 is a horizontal section taken substantially on line 2—2 of FIGURE 1, FIGURE 3 is a fragmentary plan view taken substantially on line 3—3 of FIGURE 1, FIGURE 4 is a section taken substantially on line 4—4 of FIGURE 2 illustrating latch mechanism and an associated locking bar.

FIGURE 5 is a detail section taken substantially on line 5—5 of FIGURE 2,

FIGURE 6 is a fragmentary section taken on line 6—6 of FIGURE 2,

FIGURE 7 is a section taken substantially on line 7—7 of FIGURE 4,

FIGURE 8 is a detail side elevation of the latching mechanism and the operating arm and the locking lever, FIGURE 9 is a fragmentary horizontal section taken substantially on line 9—9 of FIGURE 1, and FIGURE 10 is a perspective view of a spring embodied in the invention.

Referring specifically to the drawings, there has been illustrated the usual floor board 5, terminating in the well known fire wall 6, structurally common to all motor vehicles. Bolted or otherwise rigidly connected to the inner side of the fire wall 6 and to be disposed in a horizontal plane, is an L-shaped bracket that includes a leg 7, bolted to the fire wall 6 by suitable bolts 8. The bracket leg 7 is bent at a right angle at one end to form a mounting arm 9. The arm 9 is apertured at 10, FIG. 5, for receiving a bolt 11 and the bolt is provided with a nut 12A. Also disposed upon the bolt 11 is a shouldered collar 12 that has screw threaded engagement with the bolt and with the reduced portion 13 having clamping engagement with a disk 14 and whereby the disk is clamped against the leg 9 of the bracket. Rotatable upon the shoulder 15, is a second disk 16 that is spaced from the disk 14. Rotatable upon the reduced portion 13, is an inner control disk 17. The plates 14 and 16 are held apart for relatively free rotation of the disk 17 by studs 18 that are shouldered at 19 as shown in FIG. 7. To permit partial rotation of the disk 17, the disk 17 has been notched as indicated at 19a so as to override the stud 18 and to limit the rotary movement of the disk 17. The studs 17 and 18 thus maintain the plates or disks 14 and 16, with the collar 12 sufficiently spaced to permit freedom of rotary movement of the disk 17. The disk 17 is provided with an integral operating arm 20 having a foot portion 21 that is adapted to contact the rod 22 of the accelerator pedal 23 as shown in FIG. 1. One edge of the disk 17 is provided with a plurality of teeth 23 for a purpose to be presently described.

A locking lever 24, see particularly FIGURES 4, 8 and 10 is also pivotally connected between the disks 14 and 16 by pin 25. The pin 25 is fixed in apertures formed in the disks 14 and 16 and projects outwardly beyond these disks. The locking lever 24 is in direct alignment with the disk 17 and the locking lever is offset at its lower end and provided with teeth 26 that are adapted to have interlocking engagement with the teeth 23. As illustrated, the bolt 11 and the disk 17 is mounted eccentric to the disks 14 and 16 thus permitting one edge of the disks 14 and 16 to constitute the pivotal mounting 25 for the locking lever 24. The locking lever 24 is normally biased in a direction to cause interlocking engagement with the disk 17 and the arm 20 is normally biased in a direction to cause the foot portion of the arm 20 to bear against the accelerator rod 22. The biasing of these members is accomplished by coil spring 27 that is disposed upon the extended ends of pin 25. The spring 27 has an upper extension 28 that is formed with a hook 29 that engages over the forward edge of the lever 24 while the opposite end of the spring indicated at 30 is wrapped around the collar 12 and then extended downwardly as indicated at 30 along the side of the disk 16 where it is provided with a hook 31 that has hooking engagement over the edge of the arm 20 to bias the arm 20 and its foot portion 21 toward the rod 22 of the accelerator pedal. The spring 27 in its mounted engagement is clearly shown in FIGURE 4, one free end of the spring 27 also extending alongside the disk 14 where it overlies and bears upon the nut 12. Thus, with a single spring the lever 20 is biased in a direction toward the accelerator rod while the lever 24 is biased in a direction to have interlocking engagement with the teeth of the disk 17. It should be pointed out that the usual return spring for the accelerator rod is of greater strength than the spring 27.

The upper end of the lever 24 is pivotally connected at 33 to an actuating rod 34. The actuating rod 34 is engaged at its free end in a sleeve 35, that is slidable in a bracket 36, fixed to the underside of the vehicle dashboard in any desirable manner. The rod 34 terminates at its free end in the end of the sleeve 35 and bears against a knob 37 that telescopes upon the end of the sleeve 35 and the hub of the knob 37 bears against an outer sleeve 38 that is slidably disposed upon the tube 35. A compression spring 39 is disposed upon the sleeve 35 to bear against the bracket 36 and the end of the sleeve 38. This construction constitutes a release means manually for the lever 24 since, by pressing upon the knob 37, the rod 34 will be actuated to rock the lever 24 upon its pivot 25, to release the lever from the disk 17.

Disposed within the vehicle compartment is the usual brake pedal 40, having a hanger 41 as is customary. Fixed upon the hanger 41, as by a bracket 42, is a laterally extending rod 43 that extends from the brake hanger to overlie the edge of the lever 24. The rod 43 is anchored to the bracket 42 by nuts 44 and the nuts also constitute the means for clamping the bracket to the hanger 41. It will thus be apparent should the operator desire to release the latching device with the foot, the pedal 40 is slightly depressed, causing the rod 43 to move the lever 24 forwardly upon its pivot 25 to thus release the teeth of the lever 26 from the teeth 23 of the disk 17 thus, the latch may be released either by a manual operation for the knob 37 or by slightly depressing the brake pedal 40. The knob and its associated sleeves are adapted to project slightly forward of the dashboard for convenient manual control.

*Operation*

To activate the operator depresses the accelerator in the normal way until the speedometer indicates the speed that the operator would like to hold. The operator keeping his right foot on the accelerator 23 at the speed desired then depresses the brake pedal 40 with his left foot about ¼ inch. The contact rod 43 attached to the brake pedal hanger will then release the locking lever 24 allowing the disk 17 and its control arm 20 to rotate and make contact with the depressed accelerator rod. The operator then removes his left foot from the brake pedal and the locking lever 24 is then biased by the spring 28 to the lock position with respect to the teeth of the disk 17 and since the arm 20 is swung to follow the accelerator in its downward movement, the foot 21 will be maintained against the accelerator rod so long as the accelerator pedal is depressed and then, by the movement of the locking lever 24 that has been released by the movement of the brake pedal, the teeth of a locking lever and the disk 17 will be in latched engagement. The operator may then remove his feet from the accelerator pedal and the brake pedal and the mechanism will then sustain the movement of the car at a constant speed set by the operator. The operation of depressing and releasing the brake pedal is accomplished quickly and without noticeable pause all in one action of the left foot.

Whenever it is desired or required to reduce the speed of the vehicle, the operator depresses the brake pedal in the normal way with his right foot, causing the locking lever to release immediately and positively and the heavy spring load accelerator rod returns the operating arm to the non-operating position since, as before stated the spring bias of the accelerator rod is greater than the spring bias of the spring arm 30 and all parts will be installed to normal inoperative position.

Should the operator desire to release the brake pedal by manual control, he merely pushes the knob 37 inwardly against the tension of the spring 39, shifting the rod 34 and locking the lever 24 forwardly upon its pivot 25, thus, releasing the locking lever with respect to the disk 17, permitting the accelerator spring to shift the control or operating arm to its normal position against the tension of the spring arm 30. Upon release, the spring 39 returns the knob to its normal operative position.

The advantages of this device, are that it relieves the operator tension on long trips. Allows operator of motor vehicle to operate and maintain the vehicle at whatever constant speed, is desired. Constant pressure on the accelerator saves gasoline and eliminates constantly (pumping) the accelerator pedal. Causes the operator to become speed conscious both on the highway and city streets and enables the operator to set the device in operation through school zones or speed zones thereby greatly eliminating over-speeding through day-dreaming and thus acquiring speed tickets. With the speed control in operation, the operator can at any time accelerate the vehicle to pass a slower moving vehicle. The action of the speed control is positive and fool proof. There is no lost motion between the brake pedal control rod and the locking lever as no springs are used that would permit of a lost motion. The dual purpose one piece spring which keeps the locking lever in the locked position and advances the operating arm to operating position is foolproof.

It will thus be apparent from the foregoing that a very novel mechanism has been employed for controlling a constant speed on the vehicle, is simple in construction, is strong, durable and is easily installed upon the average modern vehicle. All parts are made of suitable material calculated to resist corrosion and mechanism requires no changes in the present vehicle control means and may be quickly and easily removed and replaced as the user may desire.

It is to be understood that the invention is not limited to the precise construction shown, but that changes are contemplated as readily fall within the spirit of the invention as shall be determined by the scope of the subjoined claims.

I claim:

1. A speed control mechanism for motor vehicles of the type that have an accelerator pedal and an accelerator rod and a brake pedal that is supported upon a hanger all within a driver's compartment of the vehicle, the speed control mechanism including a mounted bracket that is attached to the body of the vehicle and with the bracket having a right angle arm, a housing that is fixed to the arm, and with the housing embodying a pair of spaced apart plates, a disk disposed between the plates and that is rotatable between the plates, the disk having a lower arm extension that projects below the plates, the arm carrying a foot portion that overlies the accelerator rod, a locking lever that is pivotally connected between the plates, means carried by the lower ends of the lever and means carried by one edge of the disk whereby the lever and the disk are locked together, spring means for biasing the locking lever into locking engagement with the disk and also biasing the disk and its arm in a path toward the accelerator rod, means carried by the hanger for the brake pedal that is movable under the influence of the brake pedal to release the locking lever from the disk, the accelerator pedal being depressed to generate the required speed of the vehicle and with the locking lever in the release position permitting the arm of the disk and its foot to follow the movement of the accelerator rod, the said brake pedal being released after the speed has been determined for permitting the locking lever to again have interlocking engagement with the disk and manually control means connected to the upper end of the locking lever whereby the locking lever may be actuated to release the disk and to permit the accelerator rod and the accelerator pedal to return to a normal position against the bias of the spring.

2. The structure according to claim 1 wherein the plates are circular and with the disk having pivotal movement between the plates, the pivot for the disk being eccentric to the plates, pins connecting the plates together and with the disk being notched to limit its rotary movement and to have abutting engagement with one of the pins.

3. The structure according to claim 1 wherein the locking lever is pivotally connected to the plates and in the same plane as the disk, the locking lever at its lower end being provided with teeth and the disk upon one edge being also provided with teeth and whereby the locking lever is movable toward and from the disk to have interlocking engagement therewith at any point determined by the movement of the disk when the accelerator pedal is depressed.

4. The structure according to claim 3 wherein the locking lever is pivotally supported with respect to the plates and with the pivot constituting a pin that projects outwardly beyond the sides of the plates, a spring device mounted upon the extended ends of the pin and with the spring extended upwardly to form a hook to bias the locking lever in interlocking engagement with the disk, the spring also extending from the pin to the pivotal point of the disk and wrapped about the outer portion of the pivotal point for the disk and then extended downwardly to have hooked engagement with the arm of the disk and whereby the disk is at all times biased in a direction toward the accelerator rod.

5. A speed control device for use with an automotive assembly that embodies an accelerator having an accelerator rod and a brake pedal that is supported upon a hanger, the speed control device embodying a pair of spaced apart circular plates and with the plates being held in their spaced apart relation a bracket anchored to the body of the vehicle and having an arm to which the plates are attached, the plates being non-rotative, a mounting bolt for the plates and whereby the plates are held with respect to the bracket, a sleeve fixed upon the bolt and with the sleeve having a reduced end portion, the sleeve and the bolt being eccentric with respect to the plates, a rotatable disk that is supported between the plates and upon the reduced extension of the sleeve, spaced apart studs for holding the plates in spaced apart relation and with the disk being cut away to form a clearance with one of the studs and with limiting the rotary movement of the disk with respect to the plates, the disk upon one edge being provided with a plurality of teeth, a locking lever also pivotally supported between the plates and with the locking lever at its lower end being provided with teeth for engagement within the teeth of the disk, spring means for biasing the locking lever to locking engagement with the disk and with spring means biasing the disk in a direction toward the accelerator rod, the spring means being of less strength than a spring that is employed to move the accelerator rod and the accelerator pedal to normal inoperative position, means carried by the brake arm for moving the locking lever in a direction to disconnect the teeth from the teeth of the disk, the said means comprising a clamp that is fixed upon the hanger for the brake pedal, a rod fixedly connected to the clamp and that extends over the edge of the locking lever so that a slight movement of the brake pedal causes a movement of the locking lever to disengage from the disk and to permit the disk to shift in a direction toward the accelerator rod, the upper end of the locking lever being pivotally connected to a release rod and with the opposite end of the release rod being connected to a knob for the manual actuation of the locking lever with respect to the disk.

6. The structure according to claim 5 wherein the last named rod is slidable within a tubular socket and with the tubular socket being supported within a fixed bracket carried by the body portion of the vehicle, a knob carried upon a forward end of the tubular socket and spring means bearing against the bracket to force the socket and the knob forwardly, the said rod being freely slidable in the socket when the locking lever is shifted by the brake pedal and with the said rod in its engagement with the socket having abutting engagement with the knob so that the knob is free to actuate the rod manually from an instrument board of the vehicle.

References Cited by the Examiner

UNITED STATES PATENTS 2,670,822   3/1954   Reilly _____ 192—3

FOREIGN PATENTS 877,512   9/1942   France.

DON A. WAITE, *Primary Examiner.*

DAVID J. WILLIAMOWSKY, *Examiner.*